United States Patent
Barreto et al.

(10) Patent No.: US 9,420,612 B2
(45) Date of Patent: Aug. 16, 2016

(54) APPARATUS, METHOD AND COMPUTER PROGRAM PRODUCT PROVIDING SIMULTANEOUS RADIO RESOURCE AND SERVICE REQUESTS

(75) Inventors: Luis Barreto, Camberley (GB); Juho Pirskanen, Tampere (FI)

(73) Assignee: Core Wireless Licensing S.a.r.l., Luxembourg (LU)

(*) Notice: Subject to any disclaimer, the term of this patent is extended or adjusted under 35 U.S.C. 154(b) by 1042 days.

(21) Appl. No.: 11/506,741

(22) Filed: Aug. 18, 2006

(65) Prior Publication Data

US 2007/0041343 A1 Feb. 22, 2007

Related U.S. Application Data

(60) Provisional application No. 60/709,509, filed on Aug. 19, 2005.

(51) Int. Cl.
| | |
|---|---|
| H04W 4/00 | (2009.01) |
| H04W 72/00 | (2009.01) |
| H04W 76/02 | (2009.01) |
| H04W 92/12 | (2009.01) |
| H04W 92/14 | (2009.01) |

(52) U.S. Cl.
CPC .......... *H04W 76/02* (2013.01); *H04W 76/022* (2013.01); *H04W 92/12* (2013.01); *H04W 92/14* (2013.01)

(58) Field of Classification Search
CPC ......... H04W 4/20; H04W 72/04; H04L 67/04
USPC ................ 370/329; 455/414.3, 450
See application file for complete search history.

(56) References Cited

U.S. PATENT DOCUMENTS

| | | | |
|---|---|---|---|
| 2002/0077105 A1 | 6/2002 | Chang | 455/436 |
| 2003/0236085 A1* | 12/2003 | Ho | 455/411 |

(Continued)

FOREIGN PATENT DOCUMENTS

| | | |
|---|---|---|
| CA | 2428300 A1 | 11/2004 |
| EP | 1 257 141 A1 | 11/2002 |

(Continued)

OTHER PUBLICATIONS

ETSI TS 125 331 V6.6.0 (Jun. 2005), Technical Specification, "Universal Mobile Telecommunications System (UMTS); Radio Resource Control (RRC) Protocol Specification" (3GPP TS 25.331 Version 6.6.0 Release 6) pp. 395; 436-437; 480; 716-721.

(Continued)

*Primary Examiner* — Omoniyi Obayanju
(74) *Attorney, Agent, or Firm* — Core Wireless Licensing Ltd.

(57) ABSTRACT

A method includes, at a user equipment, combining a message requesting the radio resource connection and a message requesting at least one service into a single message. The single message is transmitted from the user equipment to a network element in a wireless network. Another method includes receiving, from a user equipment, a single message including both a message requesting a radio resource connection and a message requesting at least one service. In response to the message requesting radio resource connection, performing radio resource control connection establishment for the user equipment in order to establish the radio resource control connection between the user equipment and at least one of a plurality of network elements of a wireless network. In response to the message requesting at least one service, performing service request procedures for the user equipment, wherein at least part of the radio resource control connection establishment and at least part of the service request procedures are performed in parallel.

39 Claims, 10 Drawing Sheets

(56) References Cited

U.S. PATENT DOCUMENTS

2004/0102212 A1     5/2004   Sarkkinen et al. .......... 455/552.1
2004/0185837 A1*    9/2004   Kim et al. .................. 455/414.3
2006/0035645 A1*    2/2006   Kim ........................... 455/452.1

FOREIGN PATENT DOCUMENTS

| EP | 1475981 A1 | 11/2004 |
| WO | WO2004-114590 A2 | 12/2004 |
| WO | WO2005-018096 A2 | 2/2005 |

OTHER PUBLICATIONS

ETSI TS 124 008 V6.9.0 (Jun. 2005), Technical Specification, "Digital Cellular Telecommunications System (Phase 2+); Universal Mobile Telecommunications System (UMTS); Mobile Radio Interface Layer 3 Specification; Core Network Protocols; Stage 3" (3GPP TS 24.008 Version 6.9.0 Release 6) pp. 72-86; 91-93; 153-159; 168-184; 216-219; 234; 240; 300-310; 353-354.

GSM Call Flow (GSM Originating Call) EventHelix.com/Event_Studio 2.5 Aug. 1, 2004.

\* cited by examiner

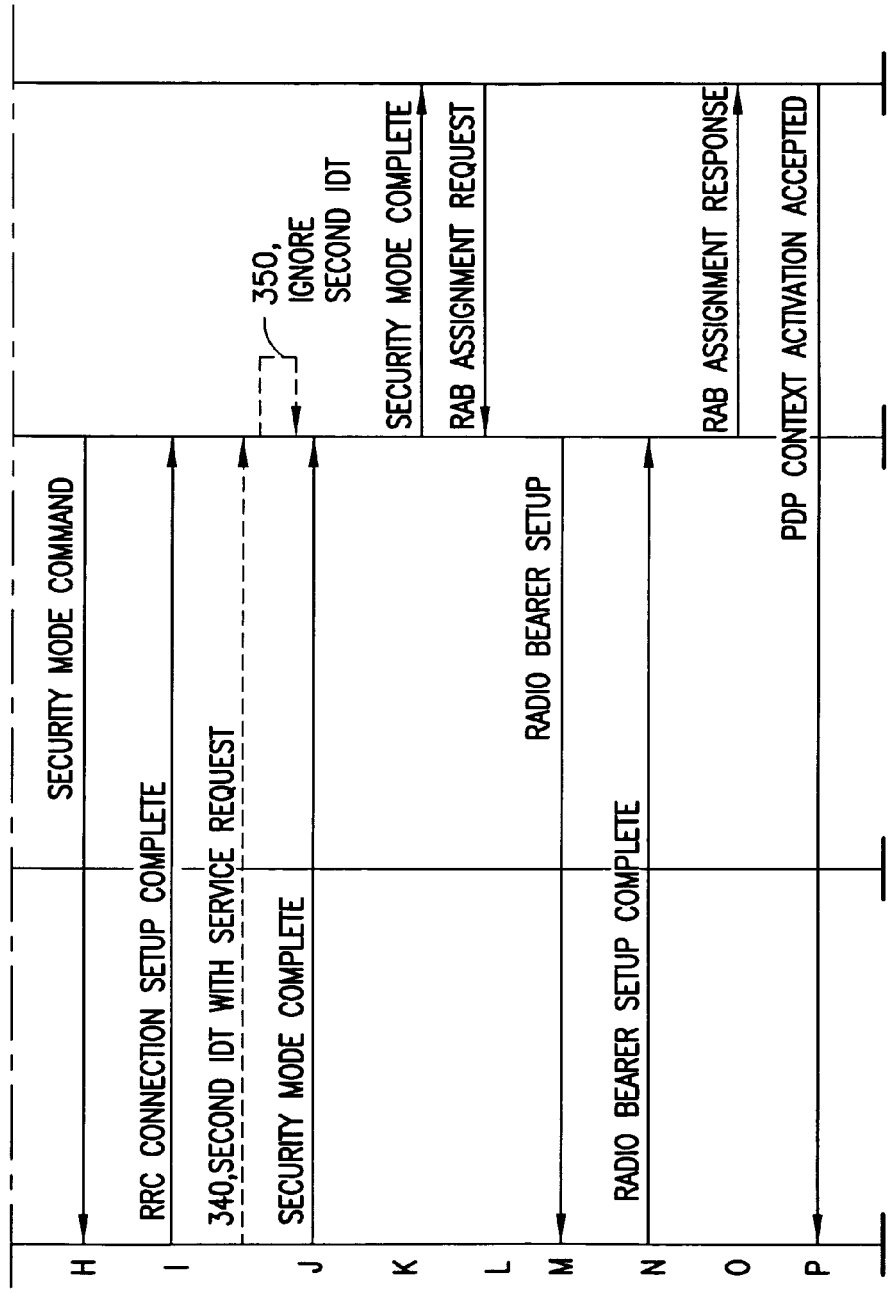

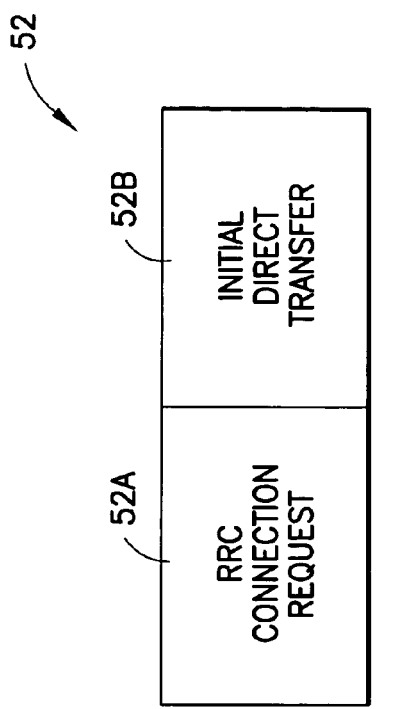
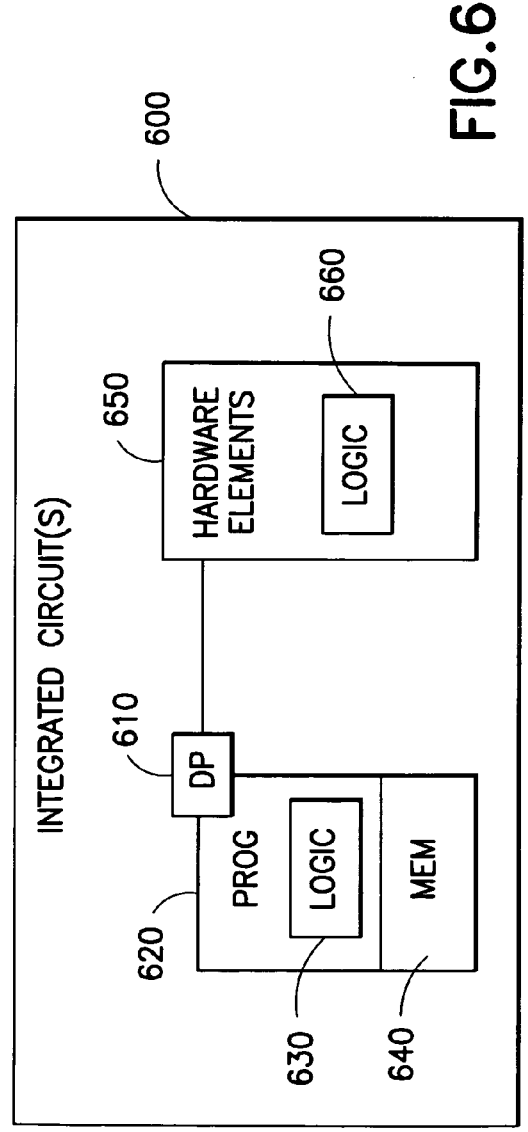

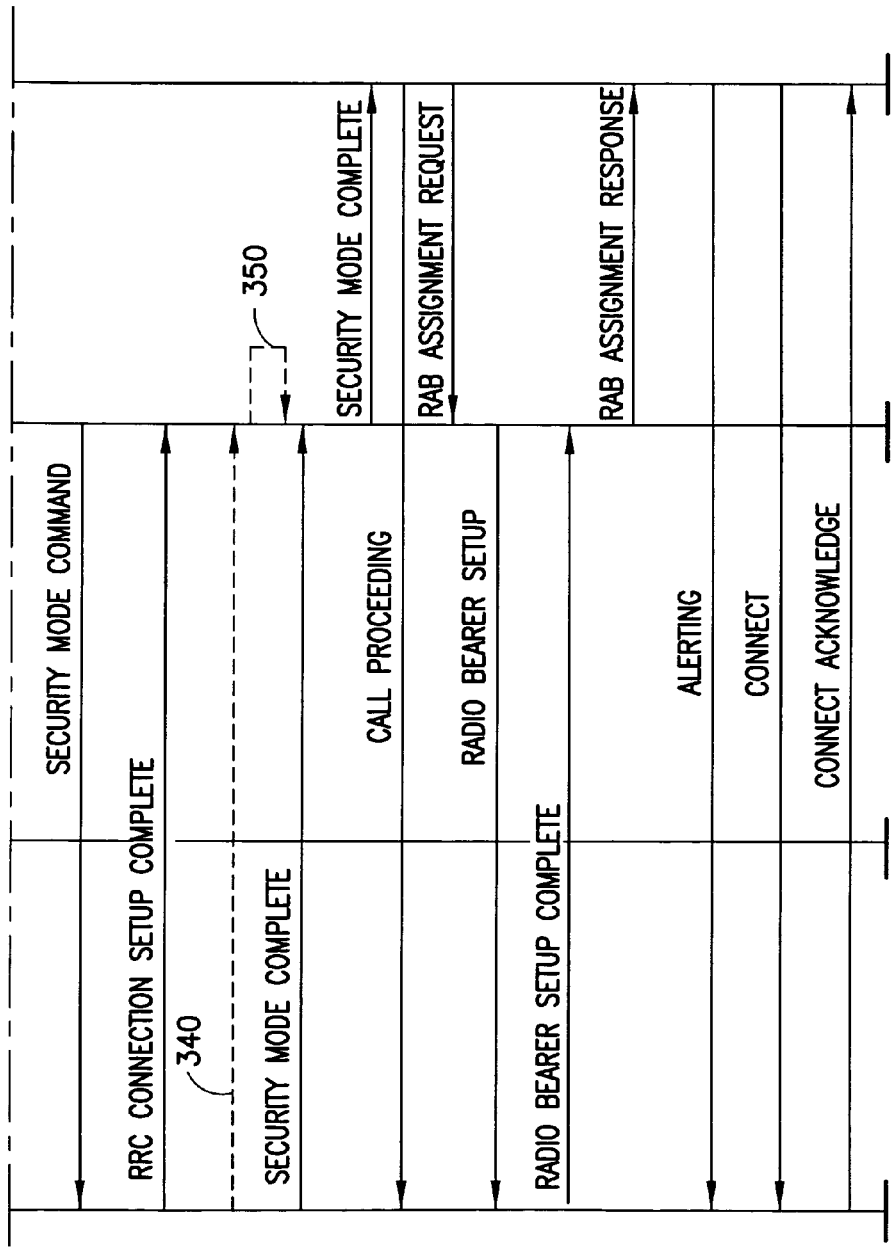

APPARATUS, METHOD AND COMPUTER PROGRAM PRODUCT PROVIDING SIMULTANEOUS RADIO RESOURCE AND SERVICE REQUESTS

CROSS-REFERENCE TO RELATED APPLICATIONS

The present application claims the benefit under 35 U.S.C. §119(e) of U.S. Provisional Patent Application No. 60/709,509, filed on Aug. 19, 2005.

TECHNICAL FIELD

The exemplary and non-limiting embodiments of this invention relate generally to wireless communications systems and, more specifically, relate to connection setup methods, apparatus and computer program products for use in a digital wireless communications network.

BACKGROUND

The architecture of the Circuit Switched (CS) and Packet Switched (PS) call establishment in Wideband Code Division Multiple Access (WCDMA) networks requires first that a Radio Resource Control (RRC) connection establishment between the User Equipment (UE) and the Radio Network Controller (RNC) as shown in FIG. 1. Typically this is done so that the UE is moved from an idle mode to a CELL_DCH state (Dedicated Channel, DCH). After this signaling exchange, the signaling between the UE and the CN (core network, PS or CS) can begin. This signaling is initiated by a service request message sent towards the PS CN (e.g., or a CM (Connection Management) service request message to the CS CN). The purpose of the Service Request procedure is to transfer the PMM (Packet Mobility Management) mode from a PMM-IDLE to a PMM-CONNECTED mode, and/or to assign a radio access bearer in the case that a Packet Data Protocol (PDP) context is activated without a radio access bearer being assigned. Reference in this regard can be had to 3GPP TS 24.008, $3^{rd}$ Generation Partnership Project; Technical Specification Group Core Network; Mobile radio interface Layer 3 specification; Core network protocols; Stage 3 (Release 5).

If no PDP context is active, the UE continues with the PDP (Packet Data Protocol) context activation procedure to activate the PDP context (or setup for CS voice) as shown in FIG. 2.

It should be noted that as currently specified the service request is carried within the RRC: Initial Direct transfer and RANAP: Initial UE Message over Uu and Iu interfaces as transparent NAS-PDU (Non-Access Stratum-Packet Data Unit). The Uu interface is the interface between the UTRAN and the UE, while the Iu is the interconnection point between the RNC or a BSC (Base Station Controller) and 3G (Third Generation) core network (CN). RANAP (Radio Access Network Application Part) is the Radio Network Layer signaling protocol for the Iu interface (e.g., between the UTRAN and Core Network). The RANAP resides in the UTRAN and the Core Network (CN). FIG. 2 presents the logical signaling transfer.

As can be seen, since the RRC connection setup and service request are performed sequentially, the current specifications inherently containing the setup delay of each of these sequential procedures. It can be shown that the RRC connection setup delay can be approximately 500 milliseconds (ms) and the Service Request setup delay can be approximately 70 ms. If one includes PDP context activation of about 1200 ms, it can be appreciated that even if using more optimized signaling transfer, such as by utilizing High Speed Uplink Packet Access (HSUPA) and High Speed Downlink Packet Access (HSDPA) for the Signaling Radio Bearers (SRBs), since these procedures are performed in sequence, achieving further delay reductions are extremely difficult.

Recent observations from commercial WCDMA networks have shown that this sequence of different procedures can introduce an unacceptable amount of delay during CS and PS call establishment.

It is known that in the GSM (Global System for Mobile communication) CS, mobile-originated call establishment case, the service request message (CM SERVICE REQUEST) is sent piggy-backed, i.e., contained in the GSM Level 2 (L2) (LAPDm; Link Access Protocol on the D-Channel, modified) messages requesting the establishment of the L2 link (which in turn, after successfully established, creates a successful Radio Resource connection). For PS services, however, the situation is different, as for any signaling or link establishment between the MS and the network a TBF (temporary block flow) establishment procedure takes place. This establishment procedure itself does not carry any Layer 3 (L3) signaling or service request. The inventors have realized that the call establishment process for PS (and CS) services is not as efficient as the process could be.

BRIEF SUMMARY

In an exemplary embodiment, a method is disclosed that includes, at a user equipment, combining a message requesting the radio resource connection and a message requesting at least one service into a single message. The method also includes transmitting the single message from the user equipment to a network element in a wireless network.

In another exemplary embodiment, a user equipment is disclosed that includes a transceiver and processing logic coupled to the transceiver. The processing logic is configured to combine a message requesting a radio resource connection and a message requesting at least one service into a single message. The processing logic is further configured to cause the transceiver to transmit, using the transceiver, the single message from the user equipment to a network element in a wireless network.

In yet another exemplary embodiment, a computer program product is disclosed that tangibly embodies a program of machine-readable instructions executable by one or more data processors to perform operations. The operations include, at a user equipment, combining a message requesting the radio resource connection and a message requesting at least one service into a single message. The operations also include causing the single message to be transmitted from the user equipment to a network element in a wireless network.

In a further exemplary embodiment, a method is disclosed that includes receiving, from a user equipment, a single message including both a message requesting the radio resource connection and a message requesting at least one service. The method includes, in response to the message requesting the radio resource connection, performing radio resource control connection establishment for the user equipment in order to establish the radio resource control connection between the user equipment and at least one of a plurality of network elements of a wireless network. The method also includes, in response to the message requesting the at least one service, performing service request procedures for the user equipment, wherein at least part of the radio resource control connection establishment and at least part of the service request procedures are performed in parallel.

In an additional exemplary embodiment, a wireless network is disclosed that includes a transceiver and processing logic coupled to the transceiver. The processing logic is configured to receive, from the transceiver and from a user equipment, a single message including both a message requesting a radio resource connection and a message requesting at least one service. The processing logic is further configured, in response to the message requesting the radio resource connection, to perform radio resource control connection establishment for the user equipment in order to establish the radio resource control connection between the user equipment and at least one network element of a wireless network. The processing logic is additionally configured, in response to the message requesting the at least one service, to perform service request procedures for the user equipment, wherein at least part of the radio resource control connection establishment and at least part of the service request procedures are performed by the processing logic in parallel.

In yet another exemplary embodiment, a computer program product is disclosed that tangibly embodies a program of machine-readable instructions executable by one or more data processors to perform operations. The operations include receiving from a user equipment a single message including both a message requesting the radio resource connection and a message requesting at least one service. The operations also include, in response to the message requesting the radio resource connection, causing radio resource control connection establishment to be performed for the user equipment in order to establish a radio resource control connection between the user equipment and at least one network element of a wireless network. The operations further include, in response to the message requesting the at least one service, causing service request procedures for the user equipment to be performed, wherein at least part of the radio resource control connection establishment and at least part of the service request procedures are performed in parallel.

In another exemplary embodiment, a method is disclosed that includes, at a user equipment, combining a message requesting a radio resource connection and a message requesting at least one service into a single message, and transmitting the single message from the user equipment to a first network element in a wireless network. The method also includes, at the first network element, receiving the single message and, in response to the message requesting the radio resource connection, and performing radio resource control connection establishment for the user equipment in order to establish a radio resource control connection between the user equipment and at least one of a plurality of network elements of a wireless network. The method further includes, at a second network element in the wireless network, in response to the message requesting the at least one service, performing service request procedures for the user equipment, wherein at least part of the radio resource control connection establishment and at least part of the service request procedures are performed in parallel.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIGS. 3A and 3B, collectively referred to as FIG. 3, show a signaling diagram of a combined RRC connection request and service request in accordance with exemplary embodiments of this invention;

FIGS. 5A and 5B illustrate exemplary embodiments of a RRC Connection Request message;

FIG. 6 is a block diagram of an apparatus suitable for use in performing embodiments of the disclosed invention; and FIGS. 7A and 7B, collectively referred to as FIG. 7, show another signaling diagram of a combined RRC connection request and service request in accordance with exemplary embodiments of this invention.

DETAILED DESCRIPTION OF EXEMPLARY EMBODIMENTS

As described above, in the GSM CS, mobile-originated call establishment case, the service request message (CM SERVICE REQUEST) is sent piggy-backed, i.e., contained in the GSM Level 2 (L2) (LAPDm) messages requesting the establishment of the L2 link (which in turn, after successfully established, creates a successful Radio Resource connection). The request for establishment of the L2 link is a request to establish one or more logical channels and the request is communicated using L2 messaging. In GSM CS, mobile-originated call establishment case, the UE already has a radio channel (e.g., frequency and timeslot) and therefore the UE already has a "radio link" prior to when the CM SERVICE REQUEST message is communicated to set up a logical channel. After a number of different steps, a completion of an RR connection occurs. Although GSM and WCDMA are different systems, in WCDMA, the L2 layer includes Radio Link Control (RLC).

By contrast, in exemplary embodiments of the disclosed invention, Layer 3 (L3) signalling, Radio Resource Control (RRC) signalling, is used. Thus, a radio resource connection is created in response to an RRC: Connection Request message. No such radio resource connection is created in the GSM CS, mobile-originated call establishment case, as an LAPDm connection creates a logical channel and not a radio resource connection.

Figure 3A:
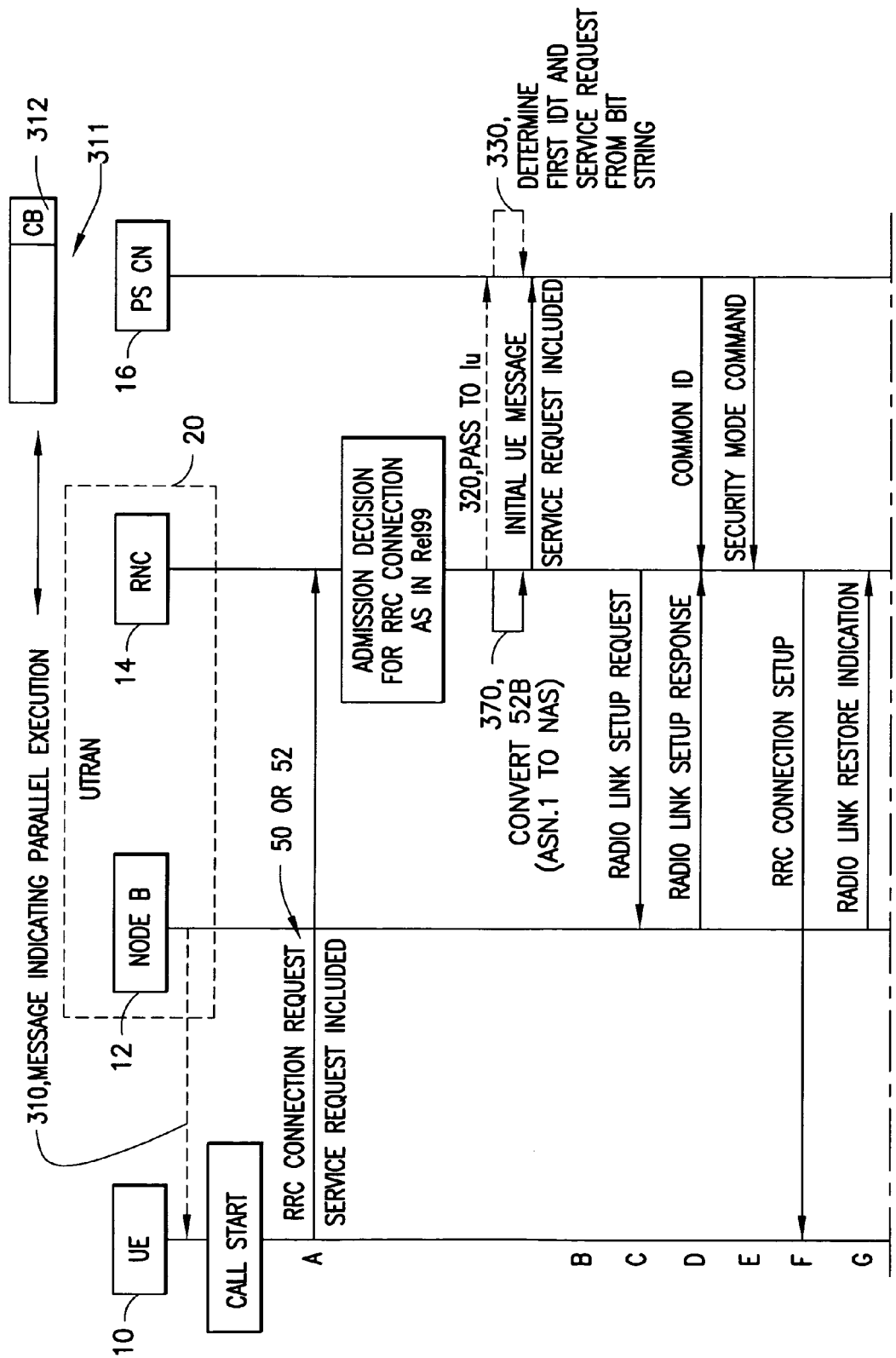
Figure 4:
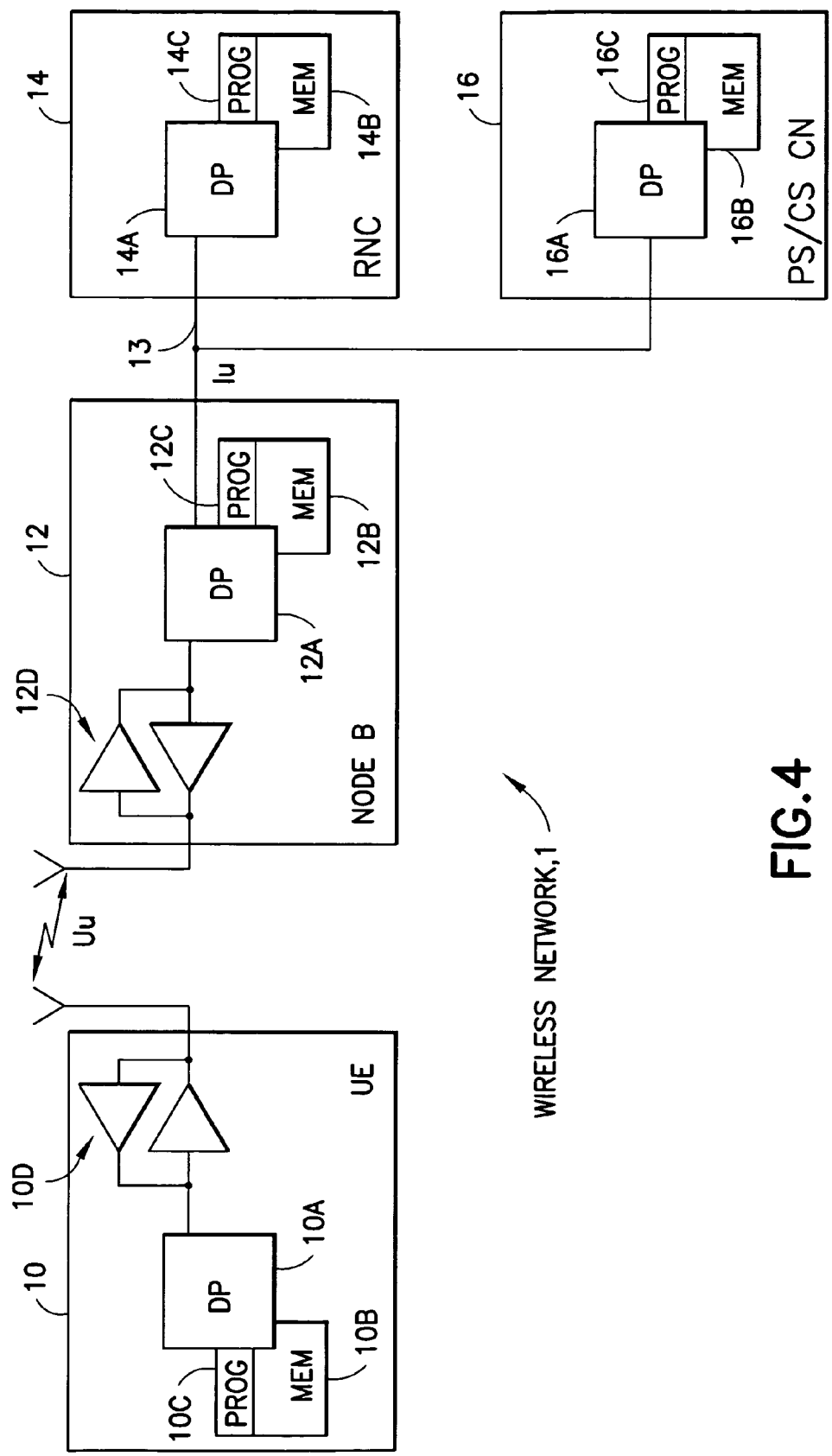
FIG. 4 is a simplified block diagram of various electronic devices that are suitable for use in practicing the exemplary embodiments of this invention.

Reference is made first to FIG. 4 for illustrating a simplified block diagram of various electronic devices that are suitable for use in practicing the exemplary embodiments of this invention. In FIG. 4, a wireless network 1 includes a UE 10, a Node B (base station) 12, a RNC 14 and a PS/CS CN 16. The Node B 12, RNC 14 and PS/CS CN 16 are examples of network nodes, as are the SGSN and GGSN shown in FIG. 2. Aspects of the disclosed invention are suitable for both packet switched (PS) and circuit switched (CS) core networks (CNs). For simplicity, the disclosure below concentrates on PS CNs, and the "PS/CS CN 16" will typically be referred to as the "PS CN 16". The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the RNC 14 and the PS CN 16, each of which include a DP 14A, 16A, a MEM 14B, 16B, each storing an associated PROG 14C, 16C. At least the PROGs 10C, 14C and 16C are assumed to include program instructions that, when executed by the associated DP, enable the electronic device to operate in accordance with the exemplary embodiments of this invention, as will be discussed below in greater detail with regard to FIG. 3. The MEMs 10B, 12B, 14B, and/or 16B may contain computer program products tangibly embodying programs of machine-readable instructions executable by one or more data processors to perform operations disclosed herein.

Figure 1:
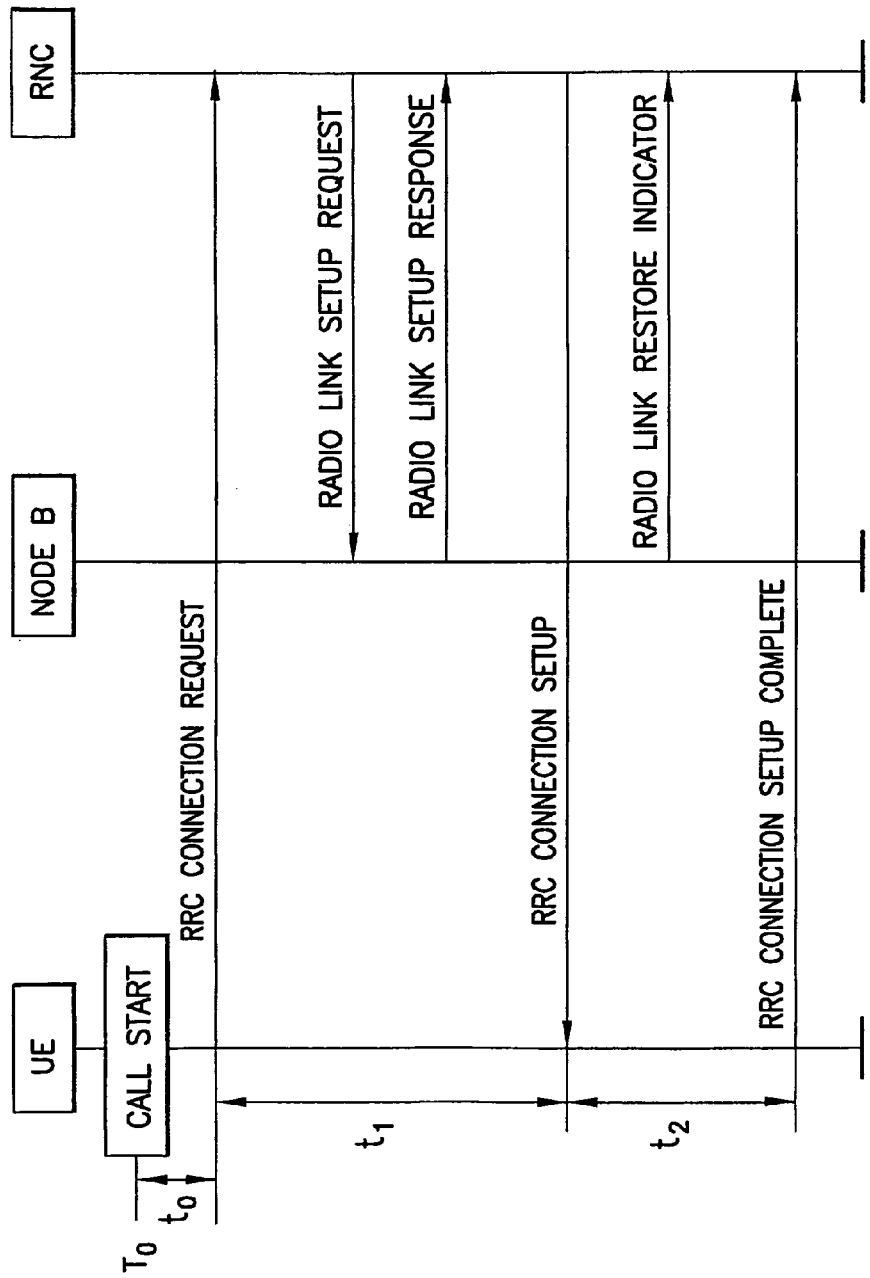
FIG. 1 shows a signaling diagram of a conventional RRC connection establishment (idle to CELL_DCH state)
Figure 2A:
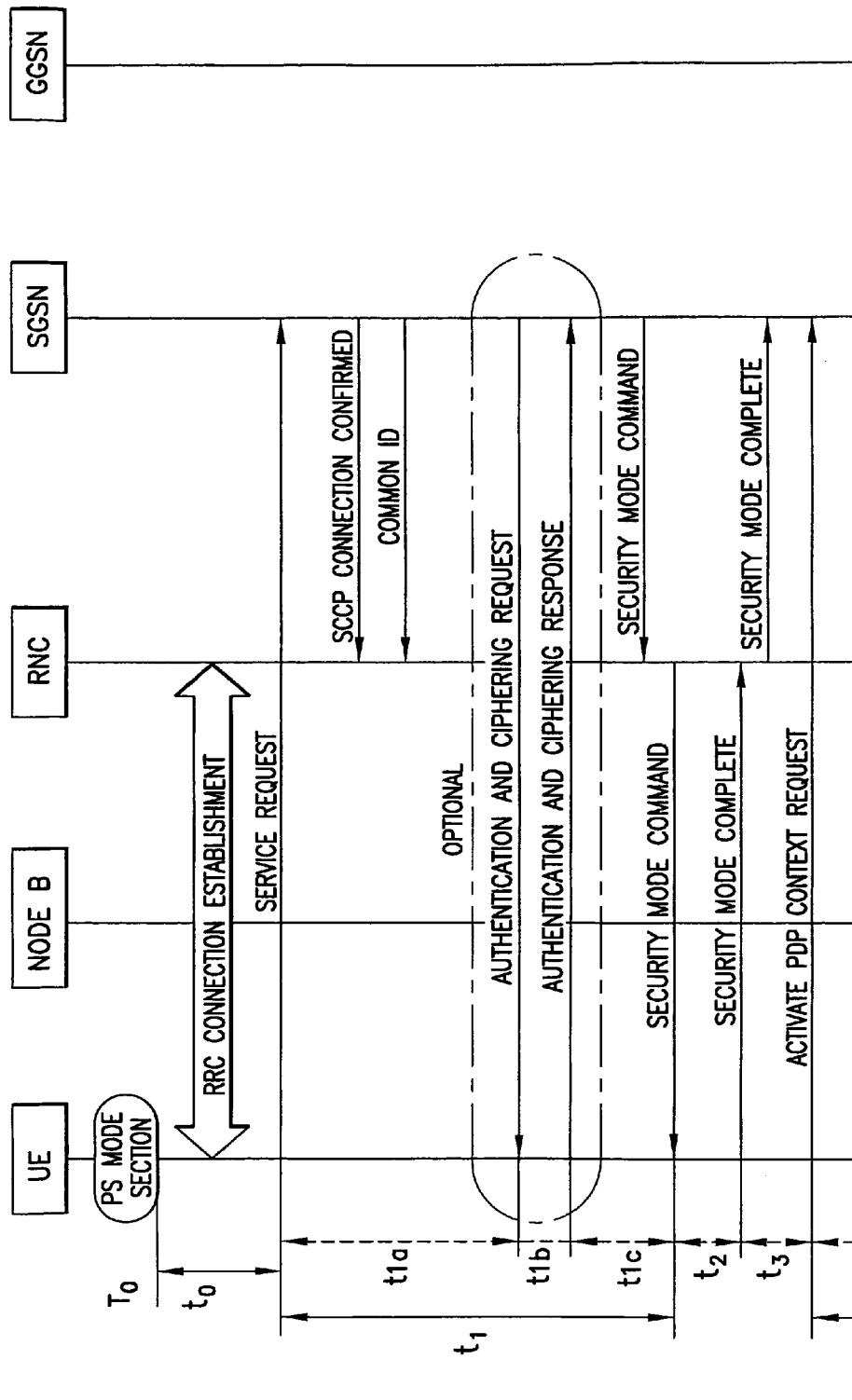
FIGS. 2A, 2B and 2C, collectively referred to as FIG. 2, show a signaling diagram of a conventional Mobile Originated Packet Connection Setup.
Figure 2B:
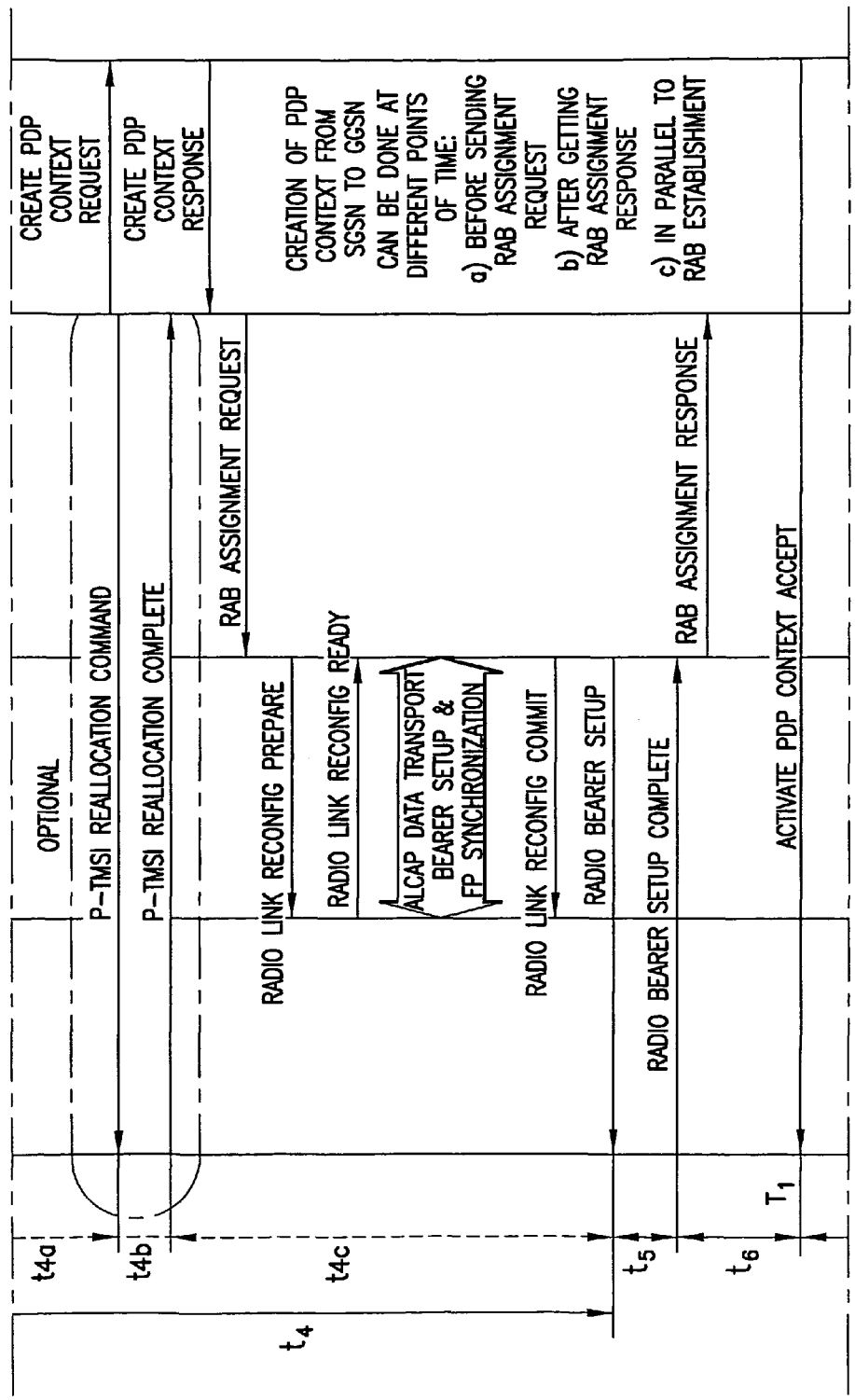
Figure 2C:
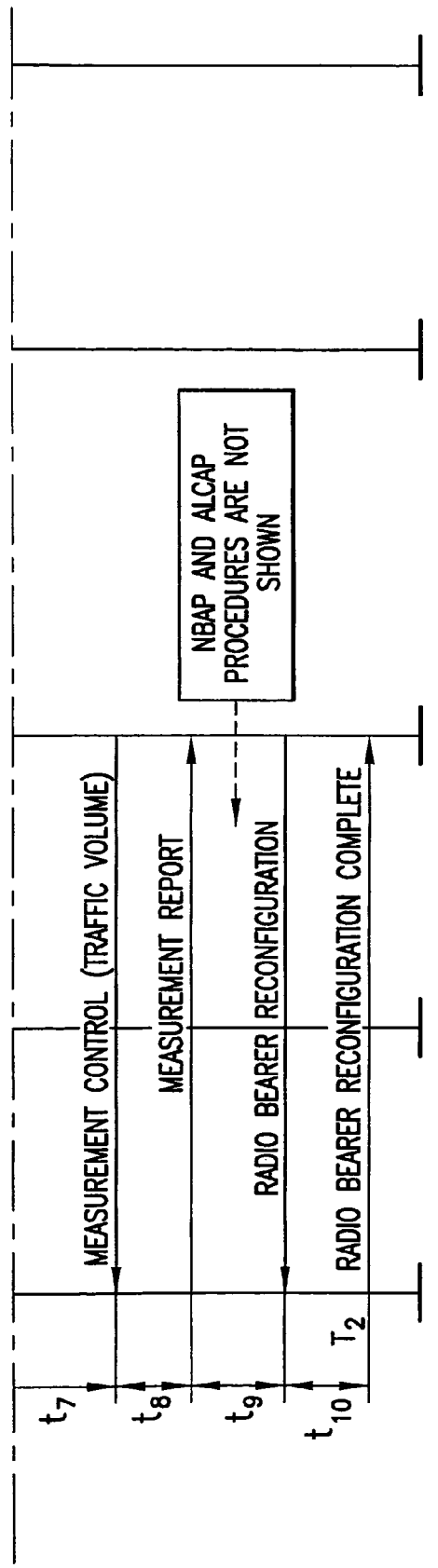
Figure 2:
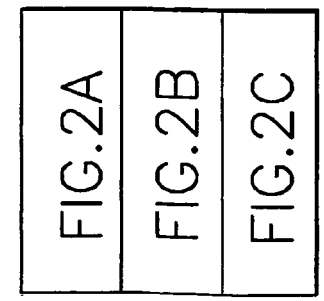

Note that the PS CN 16 may comprise the Serving Gateway Support Node (SGSN) and the Gateway GPRS (General Packet Radio Service) Support Node (GGSN) shown in FIG. 2. Note further that the Node B 12 and the RNC 14 may be referred to below collectively as the UTRAN (UMTS (Universal Mobile Telecommunications Service) Terrestrial Radio Access Network).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and the other DPs, or by hardware, or by a combination of software and hardware.

The MEMs 10B, 12B, 14B and 16B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, 14A, and 16A may be of any type suitable to the local technical environment, and may include one or more of general purpose computers, special purpose computers, microprocessors, digital signal processors (DSPs) and processors based on a multi-core processor architecture, as non-limiting examples.

It should be noted that while the Node B 12 is shown containing the PROG 12C, in order to practice this invention the PROG 12C may not need to be modified from a conventional Node B program. Further, it will be shown below that in at least some embodiments of this invention the PROG 16C of the CN 16 may not need modification so as to operate with the enhanced UE/UTRAN signaling in accordance with the invention.

As can be seen in FIG. 3, an aspect of this invention combines the RRC: RRC Connection Request message and the RRC: Initial Direct Transfer message (Step A), which contains the service request message sent by the UE 10 to the PS CN 16 (e.g., a CM service request to be sent to CS CN 16). In an exemplary embodiment, the CM service request message contains, e.g., a mobile identity, a mobile station classmark 2, a ciphering key sequence number, and a CM service type identifying the requested type of transaction (e.g., mobile originating call establishment, emergency call establishment, short message service, supplementary service activation, location services). See, e.g., 3GPP TS 24.008 V6.9.0 (2005-06), sections 4.5.1.1, 9.2.9, and 10.5.3.3. In particular, in section 10.5.3.3, four bits (one octet) are used to determine which service is requested in the CM service request message according to the following table:

| Bits | Service |
| --- | --- |
| 0 0 0 1 | Mobile originating call establishment or packet mode connection establishment |
| 0 0 1 0 | Emergency call establishment |
| 0 1 0 0 | Short message service |
| 1 0 0 0 | Supplementary service activation |
| 1 0 0 1 | Voice group call establishment |
| 1 0 1 0 | Voice broadcast call establishment |
| 1 0 1 1 | Location Services |

It should be noted that, depending on implementation, one or more services could be requested using a service request message. As both messages are sent using a single message from the UE 10 to the wireless network, the RRC connection establishment and the service request procedures are enabled to be performed in a parallel manner in the UTRAN 20 and PS CN 16, respectively. This parallel execution of these procedures beneficially removes the RRC connection establishment delay, which is currently inherent in the specifications, from the total connection setup delay. Thus, in an exemplary embodiment, CN procedures to activate PDP context are performed simultaneously with UTRAN 20 procedures to establish the RRC connection. It is noted that an Initial Direct Transfer message is used to initiate a signalling connection based on indication from upper layers and to transfer a NAS message. The RRC Connection Request message is the first message transmitted by the UE 10 when setting up an RRC connection to the network.

In a case where the network (e.g., UTRAN 20) supports this feature of parallel execution of the RRC connection establishment request and service request procedures, the UTRAN 20 indicates this capability in, for example, System Information Broadcast (SIB) messages to the UE 10. In this case the UE 10 establishes a PS or CS connection to the network by sending the RRC Connection Request message to the UTRAN 20. This message contains also the NAS: Service Request message, which is considered as a transparent bit string for radio protocols in similar manner as is done for a RRC: Initial Direct Transfer message (that currently contains the NAS service request message as a transparent container).

The conventional RRC Connection Request message can be found in tabular format in subclause 10.2.39 of 3GPP TS 25.331 (e.g., 3GPP TS 25.331, version 6.6.0, Release 6, 6-2005). This section states that the RRC Connection Request is the first message transmitted by the UE when setting up an RRC Connection to the network. The conventional Initial Direct Transfer can be found in sub-clause 10.2.16c of 3GPP TS 25.331, where it can be seen that the Initial Direct Transfer contains a NAS message, described in section 10.3.1.8. The NAS message contains the service request message. Section 10.2.16c states that the Initial Direct Transfer message is used to initiate a signalling connection based on indication from the upper layers and to transfer a NAS message. The Abstract Syntax Notation One (ASN.1) coding, used for RRC messages, is provided in section 11 of 3GPP TS 25.331.

A first exemplary embodiment of a new message format for the RRC Connection Request (e.g., inclusion of an Initial Direct Transfer message) is shown in FIG. 5A as message 50. Portion 50A represents the current RRC Connection Request, while portion 50B represents a space for a BIT STRING that the RNC 14 may be assumed does not know how to decode. Within this bit string the Initial Direct Transfer message (IDT 51) is encoded (as received from NAS) and the RNC 14 passes the encoded IDT message directly to upper layers via the Iu interface. Forwarding occurs in step 320 of FIG. 3.

Encoding is a function where readable text is encoded to bits, with specific encoding rules. RRC utilizes ASN.1 encoding/decoding, and a receiver (such as RNC 14) needs to decode the bits to readable format again based on the same encoding rules. In the example of FIG. 5A, the RRC receiver (e.g., RNC 14) does not "understand" (i.e., implement the protocol suitable for decoding) the information in the BIT STRING. Note, however, that the PS CN 16 then interprets (e.g., understands the bit string through implementation of a protocol suitable for decoding the bit string) the bit string (BIT STRING) 50B in Step 330 and determines a first Initial Direct Transfer message and its associated service request. The PS CN 16 interprets the bit string, BIT STRING, 50B because the PS CN 16 can interpret information formatted in accordance with the NAS protocol. When the message 50 is transmitted in Step A, the Initial UE message in Step B is not performed and instead Steps 320 and 330 are performed.

One advantage of this first embodiment is that the first embodiment is backwards compatible, and no new combination message is required (i.e., legacy networks that have not implemented this embodiment may simply ignore the BIT STRING).

However, the UE 10 does not know if the RNC 14 has decoded the message 50, so thus the UE 10 may still need to send the Initial Direct Transfer on its own once the RRC connection has been setup. This occurs in Step 340, when the UE 10 sends a second Initial Direct Transfer message having a service request. It is noted that Step 340 is performed in response to the message in Step 310 not being received. Step 340 allows for backward compatibility. In this example, the UTRAN 20 indicates support of parallel execution of radio resource control connection establishment and service request procedures through the use of the message in Step 310. If the message in Step 310 is not received, the UE 10 needs to fallback to a Rel99 (Release 99) solution, where the IDT is only sent after RRC Connection Setup Complete (Step I). As for a Rel99 solution, 3GPP TS 25.331, section 8.1.3 (e.g., 3GPP TS 25.331, version 6.6.0, Release 6, 6-2005), shows an RRC connection establishment procedure. The IDT procedure is shown in TS 25.331, section 8.1.8. To avoid passing the Initial Direct Transfer message information twice, the RNC 14 would need to ignore the second message. This occurs in Step 350, where the RNC 14 ignores an Initial Direct Transfer message after the message 50. An amount of coding in ASN.1 may also be needed.

A second exemplary embodiment of a new message format for the RRC Connection Request (e.g., creation of enhanced RRC Connection Request) is shown in FIG. 5B as message 52. As described above, in FIG. 5A, the IDT message is just a bit string 51B for RRC, as all information is encoded in accordance with a NAS protocol, which is not implemented in RRC (e.g., is not implemented in the UTRAN 20). In contrast, in FIG. 5B, the IDT message 52B is not encoded in accordance with NAS protocol but is instead encoded in accordance with a protocol (e.g., ASN.1) used by RRC and implemented in the UTRAN 20 for communication with the PS/CS CN 16 and implemented in the PS/CS 16 for decoding the IDT message 52B. Portion 52A in FIG. 5B represents the current RRC Connection Request, while portion 52B represents the message coding for the Initial Indirect Transfer, where both 52A and 52B are encoded using the same protocol (e.g., ASN.1).

In this embodiment, the UTRAN 20 may broadcast a capability bit in system information for informing the UE 10 that the UE 10 is permitted to transmit an "enhanced RRC Connection Request" 52. For instance, see the capability bit 312 in System Information Broadcast (SIB) 311 of the message 310, indicating capability of parallel execution of radio resource control connection establishment and service request procedures, in FIG. 3. It should be noted that the location of the capability bit 312 is merely exemplary. If this capability is indicated, the UE 10 can then use the new message 52 that is coded (e.g., optimally) with the content of both the RRC Connection Request and the Initial Direct Transfer.

When the UTRAN 20 receives the RRC Connection Request message (Step A), the UTRAN 20 processes the information elements (IEs) as is specified by current standards. For instance, in the example of FIG. 5B, both the RRC Connection Request message portion 52A and the Initial Direct Transfer portion 52B could be encoded using, e.g., the ASN.1 protocol. The UTRAN 20 (e.g., RNC 14) converts (Step 370) the Initial Direct Transfer portion 52B from ASN.1 protocol (or any other protocol implemented by the UTRAN 20) to a protocol (e.g., the NAS protocol) implemented by the PS CN 16. In this example, the Initial Direct Transfer portion 52B is converted from the first protocol (e.g., ASN.1) implemented by the UTRAN 20 to a RANAP: Initial UE message encoded using a second protocol (e.g., a NAS protocol). The UTRAN 20 then sends (Step F) the RRC connection setup message to the UE 10 after making a positive admission decision (e.g., as in Release 99). The UTRAN 20 also sends the NAS: Service Request message to the correct CN entity within the RANAP: Initial UE message (Step B). Note that Step B is performed in response to message 52 and Steps 320 and 330 are not performed in this example. In principle, the Service Request message sent in Step B can be identical to a currently specified Service Request message, thereby concealing the enhanced functionality of the UTRAN 20 completely from the NAS layers (as part of PROG 16C, for instance). Note, however, that the Service Request message may also be modified. After the PS CN 16 receives the Service Request message, the PS CN 16 begins its own Iu establishment procedure, security command procedure and, if the PDP context is already active, SGSN can begin RAB assignment procedure towards the UTRAN 20 (Step L).

It is noted that if the RRC connection setup is performed to the CELL_DCH state, a security mode command can be sent after L1 synchronization to the UE via DCH following the RB (Radio Bearer) setup procedure. If the CELL_FACH state is utilized, the security mode command and the RB setup can be sent after the RRC connection setup. As shown in FIG. 3, when the UE 10 receives the RRC connection setup message (Step F), its RRC protocol layer (part of PROG 10C and an L3 layer) acts on the IE and begins the Layer 1 (L1, physical layer) synchronization procedure if the CELL_DCH state is required. The RRC protocol layer also indicates to the NAS layer that the service request message is successfully transferred to the network and it can continue by sending a PDP context activation message to the PS CN 16 if the PDP context was not already active (Setup CN). In the case where the PDP context was already active (a typical implementation for IMS UEs is that one PDP context is constantly active after an attach procedure performed during power on), the UE 10 receives the RB (Radio Bearer) setup message as presented in FIG. 3, Step M, for presenting the call setup signaling. If the UTRAN 20 prefers to setup the RRC connection in a CELL_FACH (Fast Associated Control Channel) state the security command (Step H) and RB setup (Step M) can be sent from the UTRAN 20 immediately after an L2 acknowledgement confirms successful transmission of the RRC connection setup message (Step F).

Figure 7A:
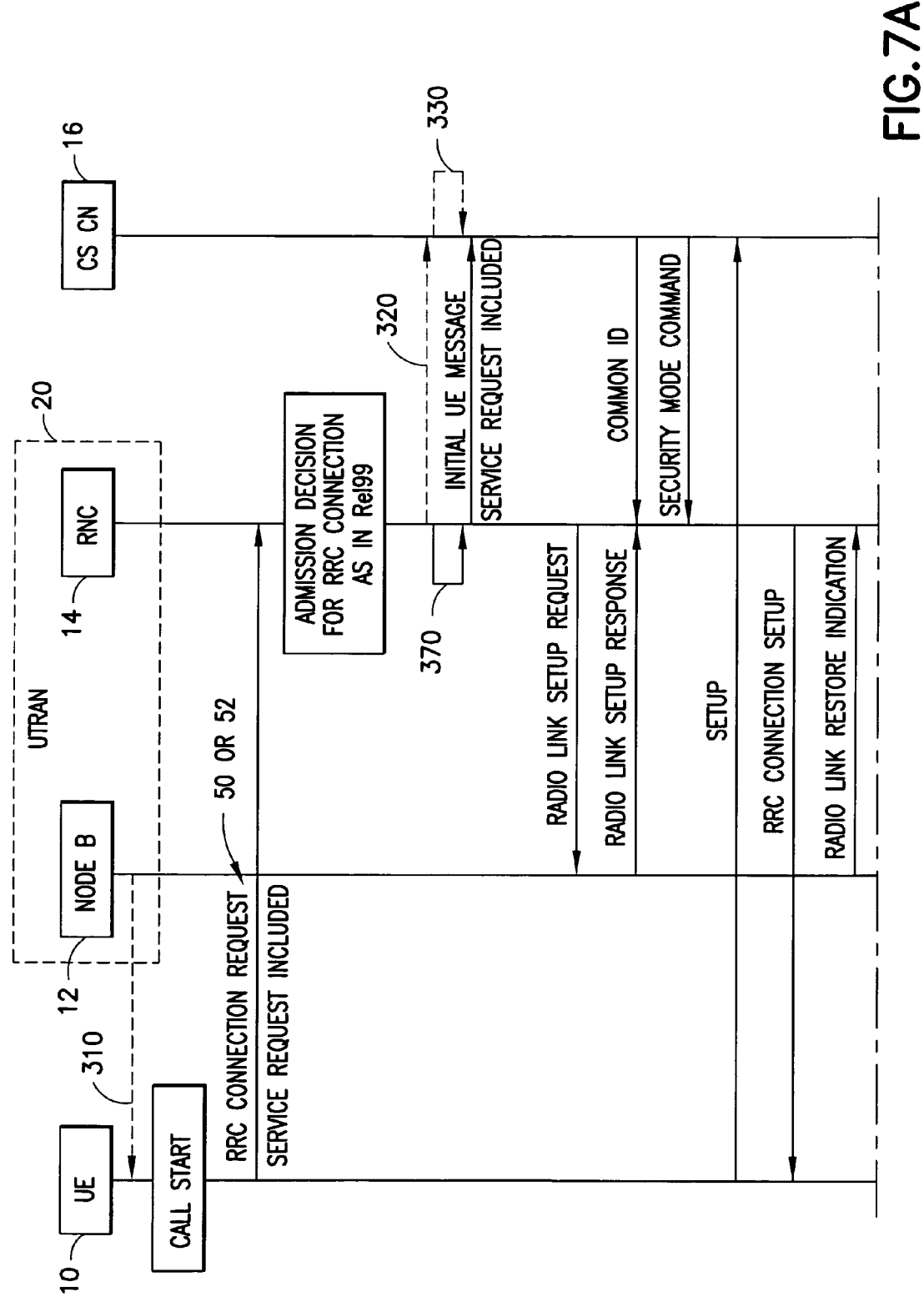

FIG. 7 shows a signaling diagram of a combined RRC connection request and service request in accordance with exemplary embodiments of this invention. FIG. 3 was directed to PS techniques, whereas FIG. 7 is directed to CS techniques. As compared with FIG. 3, in FIG. 7, there are also a Setup message from the UE 10 to the CS CN 16, a Call Proceeding message from the CS CN 16 to the UE 10, an Alerting message from the CS CN 16 to the UE 10, a Connect message from the CS CN 16 to the UE 10, and a Connect Acknowledge from the UE 10 to the CS CN 16. Note also that the PDP Context Activation Accepted message from FIG. 3 is not in FIG. 7.

In principle, an RRC: Cell Update message could also contain the NAS message (i.e., the IDT message including a CM Service Request message) as this would speed up the CS call setup in the case where the UE 10 is already in the RRC Connected state in the URA/CELL_PCH state. Instead of waiting to use Cell Update and Cell Update Confirm signaling procedures before being able to send the CM Service Request to the CS CN 16, the inclusion of the CM Service Request message to the RRC: Cell Update message (e.g., a portion of which contains the original RRC: Cell Update message) allows the Cell Update and Cell Update Confirm signaling procedures to be performed in parallel with the RRC cell update procedures.

Advantages that are realized by the use of the non-limiting embodiments of this invention include, but are not limited to, a more rapid call setup for CS and PS connections when the UE 10 is in the idle mode; changes can be limited to only the RRC Connection Request message (Step A of FIG. 3); the enhanced signaling may introduced in a backwards compatible manner for existing UEs; and further the enhanced signaling may be introduced by using the existing PS/CS core network (e.g., the enhanced signaling between the UE 10 and the UTRAN 20 can be transparent to the PS/CS CN 16).

It can be noted that fitting the RRC Connection Request message and the Service Request in one transport block (TB) may require that some optimization be made to the Service Request message, which may then require a corresponding modification to the PS/CS CN 16.

It can be further noted that even though the exemplary embodiments of this invention are related to current WCDMA radio access and PS and CS core networks, they may also be applicable for other networks, such as for the 3.9G network architecture depending on implementation.

Based on the foregoing it should be apparent that the exemplary embodiments of this invention provide a method, apparatus and computer program product(s) to combine the RRC: RRC Connection Request message and the RRC: Initial Transfer message, which contains the Service Request message sent by the UE 10 to the PS CN 16 (e.g., the CM service request is sent to the CS CN 16), where both messages are sent in a single message from UE 10 to the network, and where both RRC connection establishment and service request procedures are performed in a parallel manner in the UTRAN 20 and the PS/CS CN 16, respectively, so as to reduce the overall connection setup delay of the PS or CS connection, by performing parallel processing for setting up the RRC connection between the UE 10 and the UTRAN 20, and the Service Request between the UE 10 and the PS/CS CN 16.

In general, the various embodiments may be implemented in hardware (e.g., special purpose, circuits) or software or any combination thereof. For example, some aspects may be implemented in hardware, while other aspects may be implemented in software (e.g., firmware) which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware (e.g., special purpose circuits, general purpose hardware or a controller or other computing device) or software (e.g., firmware), or some combination thereof.

Embodiments of the inventions may be practiced in various components such as integrated circuit modules. The design of integrated circuits is by and large a highly automated process. Complex and powerful software tools are available for converting a logical level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As an example, FIG. 6 shows a block diagram of one or more integrated circuits that can be used for any of the UE 10, Node B 12, RNC 14, UTRAN 20, or CN 16. The one or more integrated circuits comprise one or more data processors 610, each data processor coupled to one or more memories 640 and hardware elements 660 (e.g., an application specific integrated circuit portion). The program PROG 620 in memory includes processing logic 630, and the hardware elements 650 include processing logic 660. The processing logic 630, 660 are suitable for carrying out embodiments of the disclosed invention. The processing logic may be distributed as shown or may be included only in the program 620 or in the hardware elements 650. It is also noted that the processing logic could be distributed amongst two or more of the DP 10A, 12A, 14A, 16A, depending upon implementation.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving, at a user equipment, a message including information indicating that a message requesting a radio resource connection and a message requesting initiation of at least one service can be combined into a single message, wherein the received message comprises a system information broadcast message comprising a bit indicating whether or not the message requesting the radio resource connection and the message requesting initiation of the at least one service can be combined into the single message;
   at the user equipment in a packet mobility management idle mode, combining, into the single message, the message requesting a radio resource connection and the message requesting initiation of the at least one service, where the message requesting initiation of the at least one service comprises a service-initiation request message that specifies a particular service requested by the user equipment and initiates a signaling connection for the particular requested service, the signaling connection being between the user equipment and a wireless network; and transmitting, prior to the initiation of the signaling connection between the user equipment and the wireless network, the single message from the user equipment to a network element in the wireless network, the single message being configured to establish the radio resource connection and initiate the signaling connection.

2. The method of claim 1, wherein the message requesting the radio resource connection comprises a radio resource control connection request message and the service-initiation request message requests initiation of at least one packet switched service.

3. The method of claim 2, further comprising:
completing a radio resource control connection procedure corresponding to the radio resource control connection request message; and
activating a packet data protocol context corresponding to the service-initiation request message.

4. The method of claim 1, wherein the message requesting the radio resource connection comprises a radio resource control connection request message and the message requesting initiation of the at least one service comprises a connection management service request message requesting initiation of at least one circuit switched service.

5. The method of claim 4, further comprising:
completing a radio resource control connection procedure corresponding to the radio resource control connection request message; and
activating the at least one circuit switched service corresponding to the connection management service request message.

6. The method of claim 4, wherein the radio resource control connection request message comprises a radio resource control: cell update message.

7. The method of claim 1, wherein the wireless network comprises a wide-band code division multiple access network,
wherein the single message is transmitted from the user equipment to the network element using the wide-band code division multiple access network,
wherein the message requesting the radio resource connection requests a radio resource connection on the wide-band code division multiple access network, and
wherein the message requesting initiation of the at least one service requests initiation of at least one service on the wide-band code division multiple access network.

8. The method of claim 1, further comprising testing the bit in order to determine whether or not the message requesting the radio resource connection and the message requesting initiation of the at least one service can be combined into the single message.

9. The method of claim 1, further comprising:
determining whether reception has occurred of a message including information indicating that the message requesting the radio resource connection and the message requesting initiation of the at least one service can be combined into the single message;
receiving, subsequent to transmission of the single message, a message indicating the radio resource connection has been set up in the wireless network for the user equipment; and
in response to both a determination that reception has not occurred of the message including information indicating that the message requesting the radio resource connection and the message requesting initiation of the at least one service can be combined into the single message and the message indicating the radio resource connection has been set up in the wireless network, transmitting from the user equipment to the network element a second message comprising the service request message.

10. The method of claim 1, wherein the single message comprises a first portion for the message requesting the radio resource connection and a second portion for a bit string,
wherein the bit string comprises an encoded initial direct transfer message including the message requesting initiation of the at least one service, and
wherein the first portion is encoded in accordance with a first protocol and the second portion is encoded in accordance with a second protocol.

11. The method of claim 10, wherein the first protocol comprises an Abstract Syntax Notation One (ASN.1) protocol and the second protocol comprises a non-access stratum protocol.

12. The method of claim 1, wherein the single message comprises a first portion for the message requesting the radio resource connection and a second portion for an initial direct transfer message, the initial direct transfer message including the message requesting initiation of the at least one service, and
wherein both the first and second portions are encoded using a single protocol.

13. An apparatus comprising:
at least one processor; and
at least one memory including computer program code, the at least one memory and the computer program code configured to, with the at least one processor, cause the apparatus to perform at least the following:
receiving, at a user equipment, a message including information indicating that a message requesting a radio resource connection and a message requesting initiation of at least one service can be combined into a single message, wherein the received message comprises a system information broadcast message comprising a bit indicating whether or not the message requesting the radio resource connection and the message requesting initiation of the at least one service can be combined into the single message;
to combine, into the single message, the message requesting a radio resource connection and the message requesting initiation of at least one service, where the message requesting initiation of the at least one service comprises a service-initiation request message that specifies a particular service requested by a user equipment and initiates a signaling connection for the particular requested service, the signaling connection being between the user equipment and a wireless network; and
to transmit, prior to the initiation of the signaling connection between the user equipment and the wireless network, the single message from the apparatus to a network element in the wireless network, the single message being configured to establish the radio resource connection and initiate the signaling connection.

14. The apparatus of claim 13, wherein the message requesting the radio resource connection comprises a radio resource control connection request message and the service-initiation request message requests initiation of at least one packet switched service.

15. The apparatus of claim 13, wherein the message requesting the radio resource connection comprises a radio resource control connection request message and the message requesting initiation of the at least one service comprises a connection management service request message requesting initiation of at least one circuit switched service.

16. The apparatus of claim 13, wherein the wireless network comprises a wide-band code division multiple access network,
wherein the single message is transmitted from the apparatus to the network element using the wide-band code division multiple access network,
wherein the message requesting the radio resource connection requests a radio resource connection on the wide-band code division multiple access network, and
wherein the message requesting initiation of the at least one service requests initiation of at least one service on the wide-band code division multiple access network.

17. A non-transitory computer readable memory tangibly embodying a program of machine-readable instructions executable by one or more data processors to perform operations comprising:
receiving, at a user equipment, a message including information indicating that a message requesting a radio resource connection and a message requesting initiation of at least one service can be combined into a single message, wherein the received message comprises a system information broadcast message comprising a bit indicating whether or not the message requesting the radio resource connection and the message requesting initiation of the at least one service can be combined into the single message;
at the user equipment in a packet mobility management idle mode, combining, into the single message, the message requesting a radio resource connection and the message requesting initiation of at least one service, where the message requesting initiation of the at least one service comprises a service-initiation request message that specifies a particular service requested by the user equipment and initiates a signaling connection for the particular requested service, the signaling connection being between the user equipment and a wireless network; and
causing the single message to be transmitted from the user equipment to a network element in a wireless network, wherein the single message is transmitted prior to the initiation of the signaling connection between the user equipment and the wireless network, the single message being configured to establish the radio resource connection and initiate the signaling connection.

18. A method comprising:
transmitting, to a user equipment, a message including information indicating that a message requesting a radio resource connection and a message requesting initiation of at least one service can be combined into a single message, wherein the transmitted message comprises a system information broadcast message comprising a bit indicating whether or not the message requesting the radio resource connection and the message can be combined into the single message;
receiving, prior to initiation of a signaling connection between the user equipment and a wireless network, from the user equipment in a packet mobility management idle mode the single message including both the message requesting a radio resource connection and the message requesting initiation of at least one service, where the message requesting initiation of the at least one service comprises a service-initiation request message that specifies a particular service requested by the user equipment and initiates a signaling connection for the particular requested service, the signaling connection being between the user equipment and the wireless network;
in response to the message requesting the radio resource connection, performing radio resource control connection establishment for the user equipment in order to establish the radio resource control connection between the user equipment and at least one of a plurality of network elements of the wireless network; and
in response to the message requesting initiation of the at least one service, performing service request initiation procedures for the user equipment, wherein at least part of the radio resource control connection establishment and at least part of the service request initiation procedures are performed in parallel.

19. The method of claim 18, wherein the message requesting the radio resource connection comprises a radio resource control connection request message and the service-initiation request message requests initiation of at least one packet switched service.

20. The method of claim 19, further comprising:
completing a radio resource control connection procedure corresponding to the radio resource control connection request message; and
activating a packet data protocol context corresponding to the service request message.

21. The method of claim 18, wherein the message requesting the radio resource connection comprises a radio resource control connection request message and the message requesting initiation of the at least one service comprises a connection management service request message requesting initiation of at least one circuit switched service.

22. The method of claim 21, further comprising:
completing a radio resource control connection procedure corresponding to the radio resource control connection request message; and
activating the circuit switched at least one service corresponding to the connection management service request message.

23. The method of claim 21, wherein the radio resource control connection request message comprises a radio resource control cell update message.

24. The method of claim 18, wherein the wireless network comprises a wide-band code division multiple access network,
wherein the single message is transmitted from the user equipment to the network element using the wide-band code division multiple access network,
wherein the message requesting the radio resource connection requests a radio resource connection on the wide-band code division multiple access network, and
wherein the message requesting initiation of the at least one service requests initiation of at least one service on the wide-band code division multiple access network.

25. The method of claim 18, further comprising:
transmitting, subsequent to reception of the single message and during the radio resource control connection establishment, a radio resource control connection setup message from one of the plurality of network elements to the user equipment;
receiving, subsequent to transmission of the radio resource control connection setup message, another message comprising the message requesting initiation of the at least one service; and
in response to the other message, ignoring at least a portion of the other message comprising the message requesting initiation of the at least one service.

26. The method of claim 18, wherein the single message comprises a first portion for the message requesting the radio resource connection and a second portion for a bit string,
wherein the bit string comprises an encoded initial direct transfer message including the message requesting the initiation of at least one service, and
wherein the method further comprises forwarding the initial direct transfer message from a first network element to a second network element and determining at the second network element the message requesting initiation of the at least one service from the initial direct transfer message.

27. The method of claim 26, wherein the message requesting the radio resource connection is encoded using a first protocol that is implemented by the first network element, the bit string is encoded using a second protocol that is implemented by the second network element, and
wherein the first network element does not implement the second protocol.

28. The method of claim 27, wherein the first protocol comprises an Abstract Syntax Notation One (ASN.1) protocol and the second protocol comprises a non-access stratum protocol.

29. The method of claim 18, wherein the single message comprises a first portion for the message requesting the radio resource connection and a second portion for an initial direct transfer message that includes the message requesting initiation of the at least one service,
wherein the first and second portions are encoded using a first protocol, and
wherein the method further comprises at a first network element determining from the initial direct transfer message an initial user equipment message in a second protocol comprising the message requesting initiation of the at least one service and communicating the initial user equipment message in the second protocol to a second network element.

30. The method of claim 29, wherein the first network element controls performance of the radio resource control connection establishment and the second network element controls performance of the service request initiation procedures.

31. An apparatus comprising:
at least one processor; and
at least one memory including computer program code, the at least one memory and the computer program code configured to, with the at least one processor, cause the apparatus to perform at least the following:
transmitting, to a user equipment, a message to the user equipment, the transmitted message including information indicating that a message requesting the radio resource connection and a message requesting initiation of the at least one service can be combined into a single message, wherein the transmitted message comprises a system information broadcast message comprising a bit indicating whether or not the message requesting the radio resource connection and the message can be combined into the single message;
to receive, prior to initiation of a signaling connection between the user equipment and a wireless network, from the user equipment in a packet mobility management idle mode the single message including both the message requesting a radio resource connection and the message requesting initiation of at least one service, where the message requesting initiation of the at least one service comprises a service-initiation request message that specifies a particular service requested by the user equipment and initiates a signaling connection for the particular requested service, the signaling connection being between the user equipment and the wireless network;
in response to the message requesting the radio resource connection, to perform radio resource control connection establishment for the user equipment in order to establish the radio resource control connection between the user equipment and at least one network element of the wireless network; and
in response to the message requesting initiation of the at least one service, to perform service request initiation procedures for the user equipment,
wherein at least part of the radio resource control connection establishment and at least part of the service request initiation procedures are performed in parallel.

32. The apparatus of claim 31, wherein the message requesting the radio resource connection comprises a radio resource control connection request message and the service-initiation request message requests initiation of at least one packet switched service.

33. The apparatus of claim 31, wherein the message requesting the radio resource connection comprises a radio resource control connection request message and the message requesting initiation of the at least one service comprises a connection management service request message requesting initiation of at least one circuit switched service.

34. The apparatus of claim 31, wherein the apparatus comprises a wide-band code division multiple access network,
wherein the single message is transmitted from the user equipment to the network element using the wide-band code division multiple access network,
wherein the message requesting the radio resource connection requests a radio resource connection on the wide-band code division multiple access network, and
wherein the message requesting initiation of the at least one service requests initiation of at least one service on the wide-band code division multiple access network.

35. A non-transitory computer readable memory tangibly embodying a program of machine-readable instructions executable by one or more data processors to perform operations comprising:
transmitting, to a user equipment, a message to the user equipment, the transmitted message including information indicating that a message requesting the radio resource connection and a message requesting initiation of the at least one service can be combined into a single message, wherein the transmitted message comprises a system information broadcast message comprising a bit indicating whether or not the message requesting the radio resource connection and the message can be combined into the single message;
receiving, prior to initiation of a signaling connection between the user equipment and a wireless network, from the user equipment in a packet mobility management idle mode the single message including both the message requesting a radio resource connection and the message requesting initiation of at least one service, where the message requesting initiation of the at least one service comprises a service-initiation request message that specifies a particular service requested by the user equipment and initiates a signaling connection for the particular requested service, the radio resource control connection being between the user equipment and the wireless network;
in response to the message requesting the radio resource connection, causing radio resource control connection establishment to be performed for the user equipment in order to establish the radio resource control connection between the user equipment and at least one network element of the wireless network; and in response to the message requesting initiation of the at least one service, causing service request initiation procedures for the user equipment to be performed, wherein at least part of the radio resource control connection establishment and at least part of the service request initiation procedures are performed in parallel.

36. The non-transitory computer readable memory of claim 35, wherein the message requesting the radio resource connection comprises a radio resource control connection request message and the service-initiation request message requests initiation of at least one packet switched service.

37. The non-transitory computer readable memory of claim 35, wherein the message requesting the radio resource connection comprises a radio resource control connection request message and the message requesting initiation of the at least one service comprises a connection management service request message requesting initiation of at least one circuit switched service.

38. The non-transitory computer readable memory of claim 35, wherein the wireless network comprises a wideband code division multiple access network, wherein the single message is transmitted from the user equipment to the network element using the wide-band code division multiple access network, wherein the message requesting the radio resource connection requests a radio resource connection on the wide-band code division multiple access network, and wherein the message requesting initiation of the at least one service requests initiation of at least one service on the wide-band code division multiple access network.

39. A method comprising:

receiving, at a user equipment, a message including information indicating that a message requesting a radio resource connection and a message requesting initiation of at least one service can be combined into a single message, wherein the received message comprises a system information broadcast message comprising a bit indicating whether or not the message requesting the radio resource connection and the message requesting initiation of the at least one service can be combined into the single message;

at the user equipment in a packet mobility management idle mode, combining, into the single message, the message requesting a radio resource connection and the message requesting initiation of at least one service, where the message requesting initiation of the at least one service comprises a service-initiation request message that specifies a particular service requested by the user equipment and initiates a signaling connection for the particular requested service between the user equipment and a wireless network, and transmitting, prior to the initiation of the signaling connection for the particular requested service by the user equipment, the single message from the user equipment to a first network element in the wireless network, the radio resource control connection being between the user equipment and the wireless network;

at the first network element, receiving the single message and, in response to the message requesting the radio resource connection, performing radio resource control connection establishment for the user equipment in order to establish the radio resource control connection between the user equipment and at least one of a plurality of network elements of a wireless network; and at a second network element in the wireless network, in response to the message requesting initiation of the at least one service, performing service request initiation procedures for the user equipment, wherein at least part of the radio resource control connection establishment and at least part of the service request initiation procedures are performed in parallel.

* * * * *